United States Patent
Sokuza (10) Patent No.: US 10,597,273 B2
(45) Date of Patent: Mar. 24, 2020

(54) CARRIER VEHICLE

(71) Applicant: NIDEC-SHIMPO CORPORATION, Kyoto (JP)

(72) Inventor: Masashi Sokuza, Kyoto (JP)

(73) Assignee: NIDEC-SHIMPO CORPORATION, Kyoto (JP)

( * ) Notice: Subject to any disclaimer, the term of this patent is extended or adjusted under 35 U.S.C. 154(b) by 0 days.

(21) Appl. No.: 16/292,331

(22) Filed: Mar. 5, 2019

(65) Prior Publication Data

US 2019/0276291 A1 Sep. 12, 2019

(30) Foreign Application Priority Data

Mar. 6, 2018 (JP) .................. 2018-039618

(51) Int. Cl.
*B66F 9/22* (2006.01)
*B60P 9/00* (2006.01)
*B66F 9/06* (2006.01)
*G05D 1/00* (2006.01)

(52) U.S. Cl.
CPC ............ *B66F 9/22* (2013.01); *B60P 9/00* (2013.01); *B66F 9/063* (2013.01); *G05D 1/0088* (2013.01); *G05D 2201/0216* (2013.01)

(58) Field of Classification Search
CPC .... B66F 9/22; B66F 9/063; B66F 9/24; B66F 9/20; B60P 9/00; G05D 1/0088; G05D 2201/0216

USPC .................... 180/167; 280/79.11
See application file for complete search history.

(56) References Cited

U.S. PATENT DOCUMENTS

| | | | | |
|---|---|---|---|---|
| 4,077,535 A | * | 3/1978 | Oriol | A61G 12/001 180/14.1 |
| 7,731,207 B2 | * | 6/2010 | Santos Gomez | B64F 5/50 280/408 |
| 7,826,919 B2 | * | 11/2010 | D'Andrea | B66F 9/063 700/214 |
| 8,676,426 B1 | * | 3/2014 | Murphy | G05D 1/0265 180/167 |
| 9,878,448 B2 | * | 1/2018 | Kang | B25J 5/007 |

FOREIGN PATENT DOCUMENTS

JP 2013114307 6/2013

* cited by examiner

Primary Examiner — John D Walters
(74) Attorney, Agent, or Firm — JCIPRNET (57) ABSTRACT

A carrier vehicle can be used for a plurality of purposes. A carrier vehicle (100) according to the disclosure includes a flat plate (120) and a moving section (130). A through-hole (122p) is provided in the flat plate (120). The moving section (130) causes the flat plate (120) to move. The moving section (120) is switched among a reference mode in which the flat plate (120) is caused to move to a reference position, a penetrating mode in which the through-hole (122p) of the flat plate (120) is penetrated through, and a moving mode in which the flat plate (120) is caused to move from the reference position to a moving position without penetrating through the through-hole (122p) of the flat plate (120).

20 Claims, 10 Drawing Sheets

CARRIER VEHICLE

CROSS-REFERENCE TO RELATED APPLICATION

This application claims the priority benefits of Japan Patent Application No. 2018-039618, filed on Mar. 6, 2018. The entirety of each of the above-mentioned patent applications is hereby incorporated by reference herein and made a part of this specification.

BACKGROUND

Technical Field

The present disclosure relates to a carrier vehicle.

Description of Related Art

Carrying of packages is often performed by carrier vehicles. For example, packages are carried by causing unmanned carrier vehicles (automated guided vehicle (AGV)) to travel in plants.

Towing a dedicated trolley with an unmanned carrier vehicle is known (see Patent Document 1, for example). The unmanned carrier vehicle described in Patent Document 1 tows the dedicated trolley with the unmanned carrier vehicle by butting a towing pin of the unmanned carrier vehicle on a towing flap of the dedicated trolley.

PATENT DOCUMENTS

[Patent Document 1] Japanese Laid-open No. 2013-114307

However, the unmanned carrier vehicle described in Patent Document 1 can only tow the dedicated trolley and cannot be applied to other purposes.

The disclosure provides a carrier vehicle that can be applied to a plurality of purposes.

SUMMARY

A carrier vehicle described as an example of the disclosure includes a flat plate and a moving section. A through-hole is provided in the flat plate. The moving section causes the flat plate to move. The moving section is switched among a reference mode in which the flat plate is caused to move to a reference position, a penetrating mode in which the through-hole in the flat plate is penetrated through, and a moving mode in which the flat plate is caused to move from the reference position to a moving position without penetrating through the through-hole in the flat plate.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

According to the disclosure described as an example, it is possible to use the carrier vehicle for a plurality of purposes.

Hereinafter, an embodiment of a carrier vehicle according to the disclosure will be described with reference to drawings. Note that the same reference numerals will be given to the same or corresponding portions in the drawings, and description thereof will not be repeated. Also, an X axis, a Y axis, and a Z axis that are orthogonal to each other may be described for easy understanding of the disclosure in the specification. The X axis and the Y axis are in parallel to each other in the horizontal direction, and the Z axis is in parallel to the vertical direction.

Figure 1:
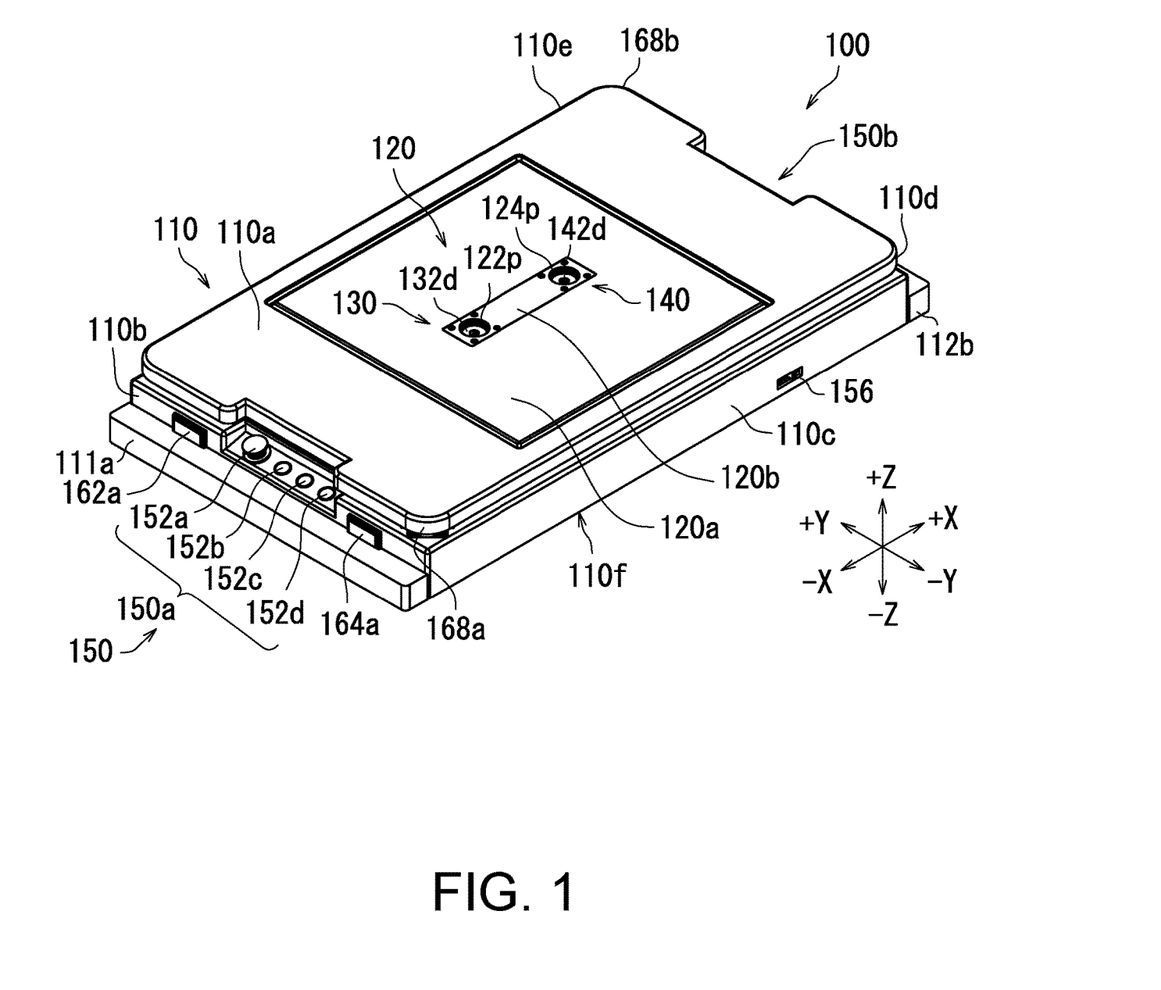
FIG. 1 is a schematic perspective view of a carrier vehicle according to the embodiment.

Referring to FIG. 1, a carrier vehicle 100 according to the embodiment will be described. FIG. 1 is a schematic perspective view illustrating the carrier vehicle 100. The carrier vehicle 100 travels. For example, the carrier vehicle 100 can carry a heavy load of equal to or greater than 10 kg and equal to or less than 5000 kg. For example, the carrier vehicle 100 may freely travel on a floor. Alternatively, the carrier vehicle 100 may travel along a predefined guide member (for example, a track).

For example, the carrier vehicle 100 is an unmanned carrier vehicle. The carrier vehicle 100 may travel in accordance with a program determined in advance. Alternatively, the carrier vehicle 100 may travel in accordance with a user's remote operation via communication.

Here, the carrier vehicle 100 extends in a longitudinal direction (X direction). For example, the length of the carrier vehicle 100 in the longitudinal direction is equal to or greater than 300 mm and equal to or less than 10 m.

In addition, the height of the carrier vehicle 100 (the length in the Z direction) here is shorter than the length of the carrier vehicle 100 (the length in the X direction) and the width of the carrier vehicle 100 (the length in the Y direction). In this case, the carrier vehicle 100 can enter a relatively low space. For example, the height of the carrier vehicle 100 is equal to or greater than 50 mm and equal to or less than 1 m. The height of the carrier vehicle 100 is preferably equal to or greater than 100 mm and equal to or less than 300 mm. However, the height of the carrier vehicle 100 (the length in the Z direction) may be greater than at least one of the length of the carrier vehicle 100 (the length in the X direction) and the width of the carrier vehicle 100 (the length in the Y direction).

The carrier vehicle 100 includes a case body 110, a flat plate 120, a first moving section 130, and a second moving section 140. The case body 110 defines an outer shape of the carrier vehicle 100. The case body 110 extends in the longitudinal direction (Y direction). Also, the height of the case body 110 (the length in the Z direction) is smaller than the length of the case body 110 (the length in the X direction) and the width of the case body 110 (the length in the Y direction).

As for the carrier vehicle 100 illustrated in FIG. 1, the length of the case body 110 (the length in the X direction) is longer than the width of the case body 110 (the length in the Y direction). However, the length of the case body 110 (the length in the X direction) may be substantially equal to the width of the case body 110 (the length in the Y direction).

The flat plate 120 is placed on the case body 110. A through-hole is provided at the upper center of the case body 110. The flat plate 120 is fitted into the through-hole at the upper center of the case body 110. The flat plate 120 can be separately detached from the case body 110. As for the carrier vehicle 100 illustrated in FIG. 1, the height of the flat plate 120 (the position in the Z direction) is substantially equal to the height of the upper surface of the case body 110 (the position in the Z direction).

For example, the length of the flat plate 120 (the length in the X direction) may be substantially equal to the width of the flat plate 120 (the length in the Y direction). For example, the length (the length in the X direction) and the width (the length in the Y direction) of the flat plate 120 is equal to or greater than 200 mm and equal to or less than 9 m and may be equal to or greater than 400 mm and equal to or less than 1 m. Note that the length of the flat plate 120 (the length in the X direction) may be different from the width of the flat plate 120 (the length in the Y direction).

A first through-hole 122*p* and a second through-hole 124*p* that penetrate through the flat plate 120 in the thickness direction (Z direction) are provided in the flat plate 120. The first through-hole 122*p* and the second through-hole 124*p* are aligned in the X direction. The first through-hole 122*p* is located on the side of the −X direction, and the second through-hole 124*p* is located on the side of the +X direction. For example, the opening diameter of the first through-hole 122*p* and the second through-hole 124*p* is equal to or greater than 10 mm and equal to or less than 200 mm and may be equal to or greater than 20 mm and equal to or less than 100 mm.

The flat plate 120 has a peripheral portion 120*a* and a central portion 120*b*. The peripheral portion 120*a* is located at the surroundings of the central portion 120*b*. Here, the first through-hole 122*p* and the second through-hole 124*p* are provided at the central portion 120*b*. The central portion 120*b* can be detached from the peripheral portion 120*a*.

The first moving section 130 and the second moving section 140 move relative to the flat plate 120. Here, the first moving section 130 and the second moving section 140 are located on the lower side in the vertical direction (−Z direction) of the flat plate 120. Specifically, the first moving section 130 and the second moving section 140 are located on the lower side in the vertical direction (−Z direction) of the central portion 120*b* of the flat plate 120.

The first moving section 130 and the second moving section 140 can move the flat plate 120 in the Z direction. For example, the first moving section 130 and the second moving section 140 can lift the flat plate 120 in the +Z direction. Also, the first moving section 130 and the second moving section 140 can lower the flat plate 120 in the −Z direction.

A part of the first moving section 130 and a part of the second moving section 140 are exposed from the flat plate 120. The first moving section 130 has a first tip end 132*d*. A part of the first tip end 132*d* of the first moving section 130 is exposed from the first through-hole 122*p* of the flat plate 120. In addition, the second moving section 140 has a second tip end 142*d*. A part of the second tip end 142*d* of the second moving section 140 is exposed from the second through-hole 124*p* of the flat plate 120. Details of the first moving section 130 and the second moving section 140 will be described later.

The carrier vehicle 100 preferably further includes an operation section 150. It is possible to operate the carrier vehicle 100 with the operation section 150. The operation section 150 is provided at an end on the side of the −X direction and an end on the side of the +X direction of the case body 110. For example, the operation section 150 includes a first operation section 150*a* and the second operation section 150*b*. The first operation section 150*a* is provided at an end of the case body 110 on the side of the −X direction, and the second operation section 150*b* is provided at an end of the case body 110 on the side of the +X direction. Therefore, it is possible to easily operate the carrier vehicle 100 even after the carrier vehicle 100 collides against a wall in the course of carrying a carried article (package) with a large volume using the carrier vehicle 100 since either the first operation section 150*a* or the second operation section 150*b* is not interposed between the carried article and the wall and can be operated.

The first operation section 150*a* has a stop button 152*a*, a reset button 152*b*, a lifting button 152*c*, and a lowering button 152*d*. The stop button 152*a* is used to stop traveling of the carrier vehicle 100 that is traveling. In a case in which a person enters the surroundings of the carrier vehicle 100 that is traveling, for example, it is possible to stop the traveling of the carrier vehicle 100 by pressing the stop button 152*a*.

The reset button 152*b* is used to reset a control program for the carrier vehicle 100. If the reset button 152*b* is pressed, the program for the carrier vehicle 100 that is traveling is reset. For example, the reset button 152*b* is suitably used after the carrier vehicle 100 is urgently stopped or after the stop button 152*a* is pressed.

The lifting button 152*c* is used to move the first moving section 130 and the second moving section 140. If the lifting button 152*c* is pressed, the first moving section 130 and the second moving section 140 are lifted. The lowering button 152*d* is used to move the first moving section 130 and the second moving section 140. If the lowering button 152*d* is pressed, the first moving section 130 and the second moving section 140 are lowered. Details of lifting and lowering of the first moving section 130 and the second moving section 140 will be described later.

The case body 110 has an essentially rectangular parallelepiped shape with a through-hole provided in the upper surface and with a recessed lower surface. The case body 110 has an upper surface 110*a*, a side surface 110*b*, a side surface 110*c*, a side surface 110*d*, a side surface 110*e*, and a bottom surface 110*f*. A through-hole is provided in the upper surface 110a. The flat plate 120 is fitted into the through-hole in the upper surface 110a.

The side surface 110b extends in the Y direction. The first operation section 150a of the operation section 150 is provided on the side surface 110b. Also, a bumper 111a is attached to a lower side of the side surface 110b. If the bumper 111a collides with an obstacle during the traveling of the carrier vehicle 100, the traveling of the carrier vehicle 100 is stopped.

Further, a display lamp 162a and a display lamp 164a are provided on the side surface 110b. For example, the display lamp 162a and the display lamp 164a include light emitting diodes (LED). The display lamp 162a is located on the side of the +Y direction on the side surface 110b, and the display lamp 164a is located on the side of the −Y direction on the side surface 110b. The display lamp 162a is turned on or blinked when the carrier vehicle 100 travels in the −X direction and the +Y direction. The display lamp 164a is turned on or blinked when the carrier vehicle 100 travels in the −X direction and the −Y direction.

The side surface 110c extends in the X direction. A power switch 156 is provided on the side surface 110c. A power state of the carrier vehicle 100 is switched by switching the power switch 156.

The side surface 110d extends in the Y direction. The side surface 110d is substantially parallel to the side surface 110b. The second operation section 150b of the operation section 150 is provided on the side surface 110d. Also, the side surface 110e extends in the X direction. The side surface 110e is substantially parallel to the side surface 110c.

Note that a sensor 168a is provided at a boundary between the side surface 110b and the side surface 110c. A sensor 168b is provided at a boundary between the side surface 110d and the side surface 110e. The sensor 168a measures a distance between the sensor 168a and a target. Specifically, the sensor 168a measures a distance between an object located in the surroundings of the side surface 110b and the side surface 110c and the sensor 168a. Similarly, the sensor 168b measures the distance between the sensor 168b and the target. The sensor 168b measures a distance between an object located in the surroundings of the side surface 110d and the side surface 110e and the sensor 168b.

The sensor 168a and the sensor 168b have output sections and light receiving sections. For example, the output sections output laser light, and the light receiving sections receive laser light reflected by the object. Here, the sensor 168a and the sensor 168b are arranged at positions on the case body 110 at which the sensor 168a and the sensor 168b face each other. In this manner, it is possible to detect the surroundings of the carrier vehicle 100 with a small number of sensors.

Figure 2:
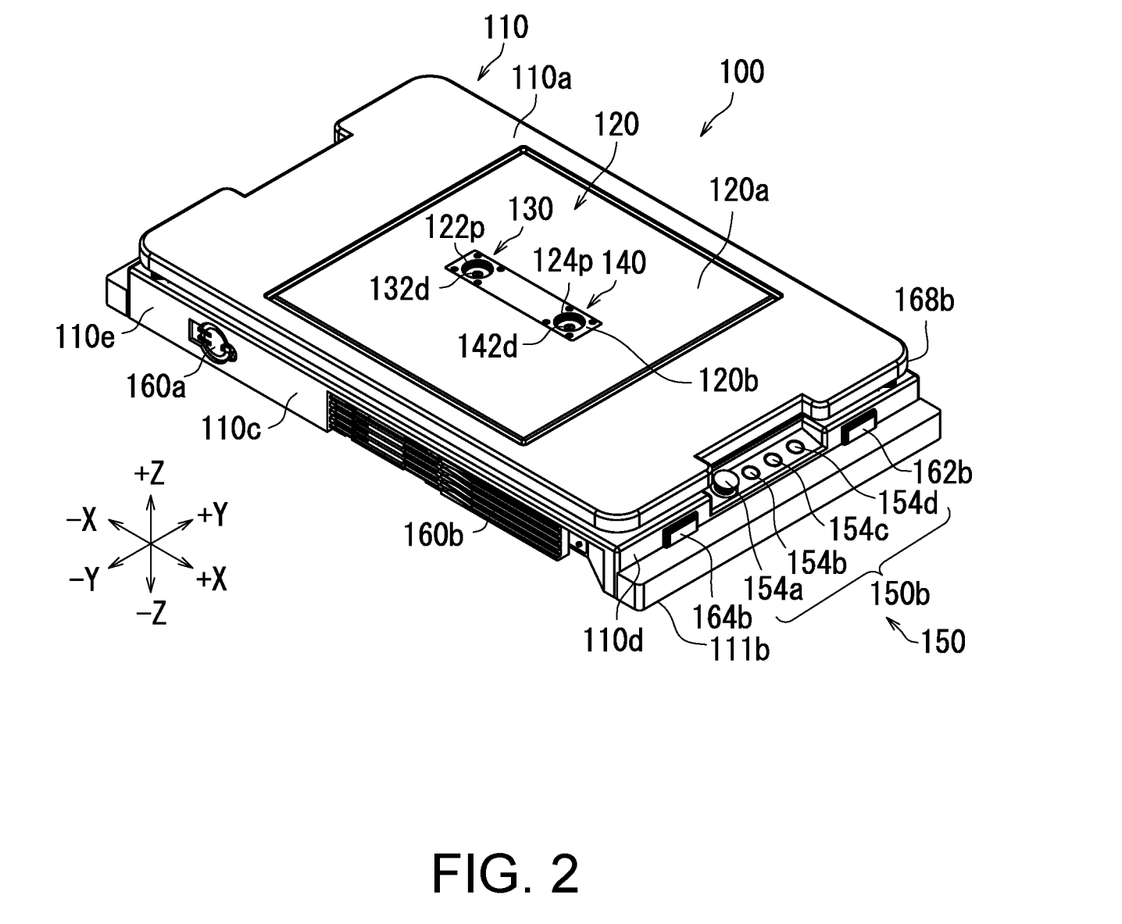
FIG. 2 is another schematic perspective view of the carrier vehicle according to the embodiment.

FIG. 2 is another schematic perspective view of the carrier vehicle 100. As described above, the second operation section 150b of the operation section 150 is provided on the side surface 110d. The second operation section 150b has a stop button 154a, a reset button 154b, a lifting button 154c, and a lowering button 154d.

The second operation section 150b can operate the carrier vehicle 100 similarly to the first operation section 150a. For example, operations using the stop button 154a, the reset button 154b, the lifting button 154c, and the lowering button 154d are the same as the operations using the stop button 152a, the reset button 152b, the lifting button 152c, and the lowering button 152d. Therefore, it is possible to easily operate the carrier vehicle 100 even after the carrier vehicle 100 collides against a wall in the course of carrying a carried article (package) with a large volume using the carrier vehicle 100 since either the first operation section 150a and the second operation section 150b can perform all the operations without being interposed between the carried article and the wall.

A bumper 111b is attached to the lower side of the side surface 110d. If the bumper 111b collides against an obstacle during traveling of the carrier vehicle 100, traveling of the carrier vehicle 100 is stopped.

Further, a display lamp 162b and a display lamp 164b are provided on the side surface 110d. The display lamp 162b is located on the side of the +Y direction on the side surface 110d, and the display lamp 164b is located on the side of the −Y direction on the side surface 110b. The display lamp 162b is turned on or blinked when the carrier vehicle 100 travels in the +X direction and the +Y direction. The display lamp 164b is turned on or blinked when the carrier vehicle 100 travels in the +X direction and the −Y direction.

A charging section 160a and a charging section 160b are provided on the side surface 110e. The charging section 160a and the charging section 160b charge the energy of the carrier vehicle 100. The charging section 160a charges the carrier vehicle 100 in a scheme that is different from that of the charging section 160b. For example, the charging section 160a charges the carrier vehicle 100 in a plug scheme. The charging section 160b charges the carrier vehicle 100 in a contact scheme.

As will be understood from FIGS. 1 and 2, the upper surface 110a of the case body 110 of the carrier vehicle 100 are linearly symmetric with respect to the center line in parallel to the Y direction. Also, the side surface 110b and the side surface 110d of the case body 110 of the carrier vehicle 100 are linearly symmetric with respect to the center line in parallel to the Y direction.

Figure 3:
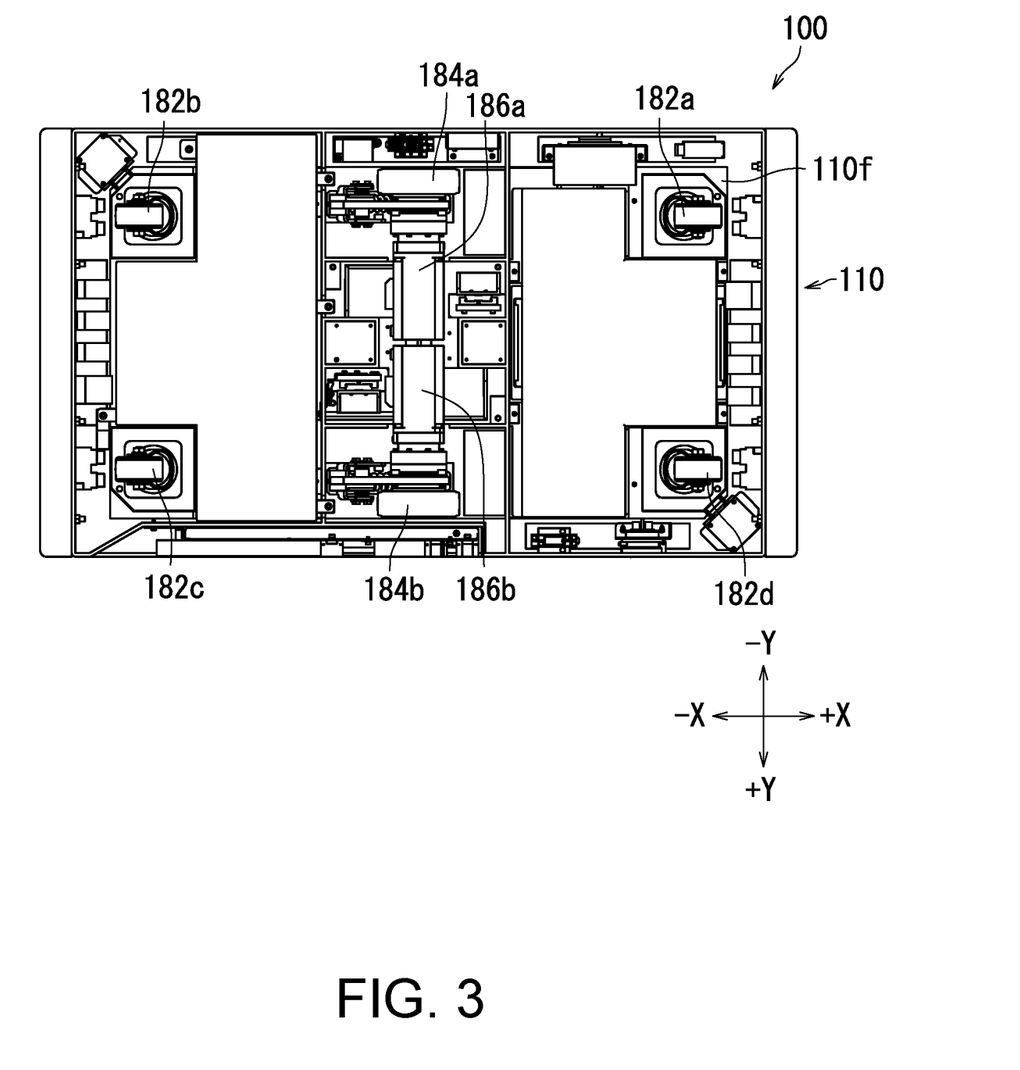
FIG. 3 is a schematic bottom view of the carrier vehicle according to the embodiment.

FIG. 3 is a schematic bottom view illustrating the carrier vehicle 100 according to the embodiment. As illustrated in FIG. 3, a wheel 182a, a wheel 182b, a wheel 182c, a wheel 182d, a drive wheel 184a, a drive wheel 184b, a motor 186a, and a motor 186b are attached to the bottom surface 110f of the case body 110.

The wheel 182a, the wheel 182b, the wheel 182c, and the wheel 182d are so-called casters and are driven in accordance with drive of the drive wheel 184a and the drive wheel 184b. The wheel 182a is located on the side of the +X direction and the −Y direction relative to the center of the bottom surface 110f, and the wheel 182b is located on the side of the −X direction and the −Y direction relative to the center of the bottom surface 110f. The wheel 182c is located on the side of the −X direction and the +Y direction relative to the center of the bottom surface 110f, and the wheel 182d is located on the side of the +X direction and the +Y direction relative to the center of the bottom surface 110f.

The drive wheel 184a is coupled to the motor 186a and is driven by drive force of the motor 186a. In addition, the drive wheel 184b is coupled to the motor 186b and is driven by drive force of the motor 186b. The drive wheel 184a is located at the center of the bottom surface 110f in the X direction and on the side of the −Y direction. The drive wheel 184b is located at the center of the bottom surface 110f in the X direction and on the side of the +Y direction.

The motor 186a is located at the center in the X direction and on the side of the −Y direction relative to the center of the bottom surface 110f. The motor 186b is located at the center in the X direction and on the side of the +Y direction relative to the center of the bottom surface 110f.

The carrier vehicle 100 according to the embodiment is switched among three modes. Specifically, the carrier vehicle 100 according to the embodiment is switched among a reference mode, a penetrating mode, and a moving mode, and positional relationships of the flat plate 120, the first moving section 130, and the second moving section 140 change in accordance with the switching of the modes. The modes of the carrier vehicle 100 are switched in accordance with switching of the mode of the first moving section 130 and the second moving section 140.

The first moving section 130 and the second moving section 140 move differently relative to the flat plate 120 in accordance with the modes. The first moving section 130 and the second moving section 140 are switched among the reference mode, the penetrating mode, and the moving mode. In the reference mode, the first moving section 130 and the second moving section 140 move the flat plate 120 to a reference position. In the penetrating mode, at least a part of the first moving section 130 penetrates through the first through-hole 122*p* in the flat plate 120, and at least a part of the second moving section 140 penetrates through the second through-hole 124*p* of the flat plate 120. In the moving mode, the first moving section 130 and the second moving section 140 move the flat plate 120 from the reference position to the moving position without penetrating through the first through-hole 122*p* and the second through-hole 124*p* in the flat plate 120. Since it is possible to switch the carrier vehicle 100 according to the embodiment among the plurality of modes in this manner, it is possible to use the carrier vehicle 100 for a plurality of purposes.

First, the carrier vehicle 100 in the reference mode according to the embodiment will be described with reference to FIGS. 1, 2, and 4 to 6. Note that FIGS. 1 and 2 referred to for the above description are perspective views of the carrier vehicle 100 in the reference mode.

Figure 4:
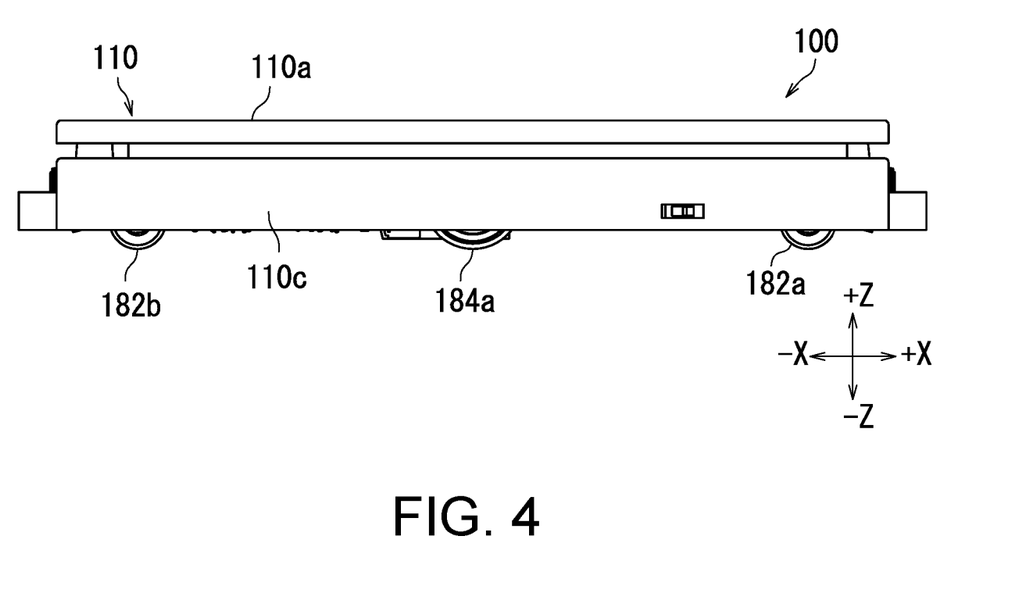
FIG. 4 is a schematic side view illustrating the carrier vehicle in a reference mode according to the embodiment.

FIG. 4 is a schematic side view illustrating the carrier vehicle 100 in the reference mode. When the carrier vehicle 100 in the reference mode is seen from the side surface as illustrated in FIG. 4, the upper surface 110*a* of the case body 110 is seen while the flat plate 120 is hidden by the upper surface 110*a* and is not seen. In the reference mode, the flat plate 120 is fitted into the through-hole in the upper surface 110*a* of the case body 110.

Figure 5:
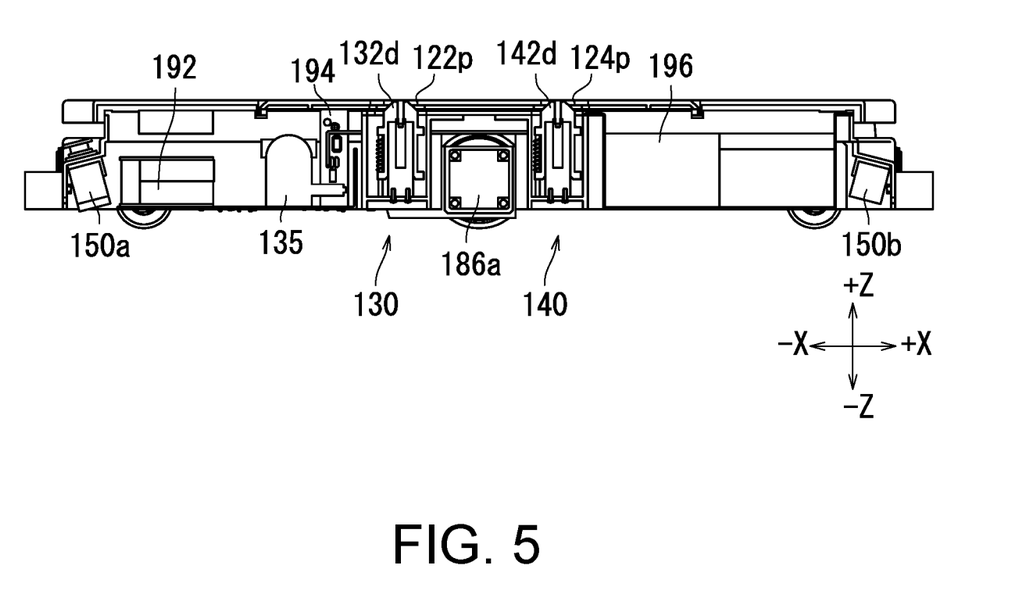
FIG. 5 is a schematic sectional view illustrating the carrier vehicle in the reference mode according to the embodiment.
Figure 6:
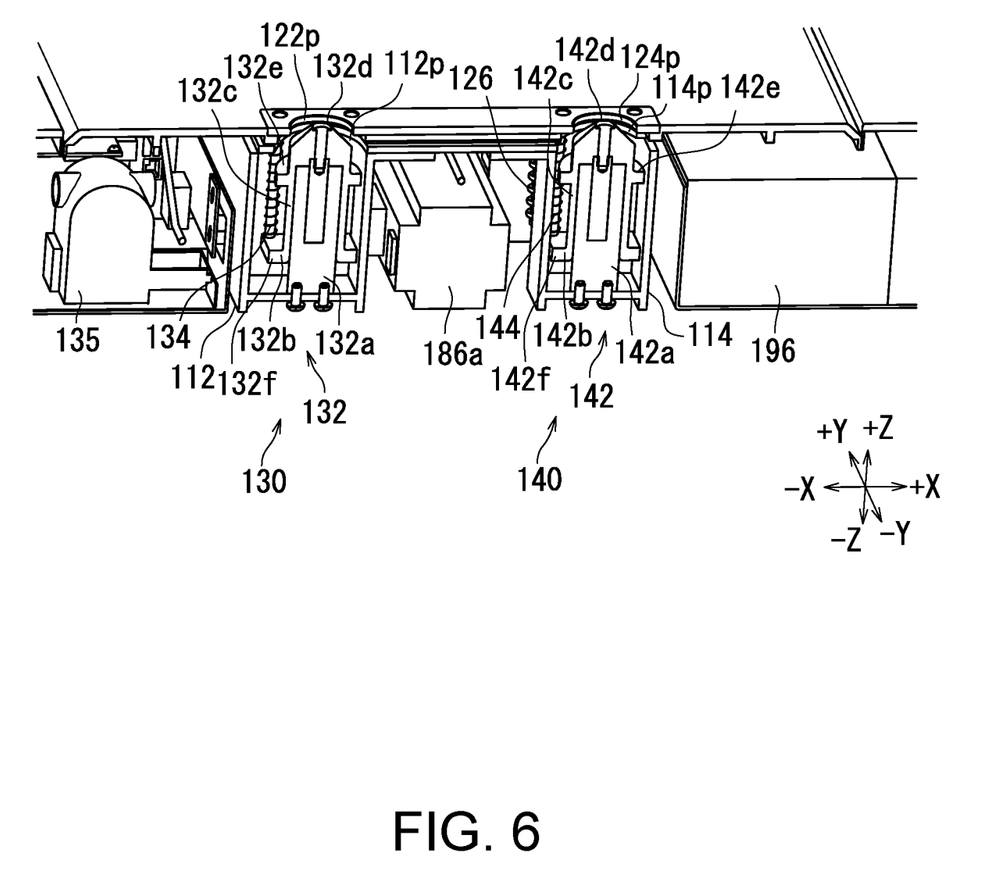
FIG. 6 is another schematic sectional view illustrating the carrier vehicle in the reference mode according to the embodiment.

FIG. 5 is a schematic sectional view illustrating the carrier vehicle 100 in the reference mode, and FIG. 6 is another schematic sectional view illustrating the carrier vehicle 100 in the reference mode. As illustrated in FIGS. 5 and 6, the first moving section 130, the second moving section 140, a motor driver 192, a circuit board 194, and a storage battery 196 are arranged inside the case body 110 of the carrier vehicle 100. The motor driver 192 drives the motor 186*a* and the motor 186*b* (FIG. 3).

The circuit board 194 includes a processor. The processor may include a central processing unit (CPU). Alternatively, the processor may include a microcomputer. Alternatively, the processor may include an integrated circuit for a specific purpose.

The storage battery 196 accumulates electrical energy. The storage battery 196 accumulates the electrical energy received from the charging section 160*a* and the charging section 160*b* (FIG. 2). The electric energy of the storage battery 196 is used to drive the motor 186*a*, the motor 186*b*, the motor driver 192, and the circuit board 194.

The first moving section 130 includes an actuator 132. The second moving section 140 includes an actuator 142. For example, the actuator 132 and the actuator 142 include hydraulic cylinders.

A pump 135 drives the actuator 132 and the actuator 142. The actuator 132 and the actuator 142 move in accordance with a hydraulic pressure generated by the pump 135. Note that although the actuator 132 and the actuator 142 here are driven by the common pump 135, the actuator 132 and the actuator 142 may be driven by different pumps.

The actuator 132 has a shape in which an upper portion of a conical shape and a lower portion of a substantially columnar shape are integrated. The actuator 132 has a securing section 132*a* and an outer peripheral portion 132*b*. The securing section 132*a* has a columnar shape. The outer peripheral portion 132*b* has a cylindrical shape with a conical shape provided at the tip end thereof, and the outer peripheral portion 132*b* is arranged at an outer periphery of the securing section 132*a*. The outer peripheral portion 132*b* moves relative to the securing section 132*a*.

The outer peripheral portion 132*b* has a main body 132*c*, a first tip end 132*d*, a first flange section 132*e*, and a second flange section 132*f*. The first tip end 132*d* has a conical shape. The first tip end 132*d* is provided at the main body 132*c* on the side of the +Z direction, and the first tip end 132*d* is located at the tip end of the actuator 132. The outer diameter (the length in the X direction) of the first tip end 132*d* of the actuator 132 is smaller than the opening diameter of the first through-hole 122*p* of the flat plate 120. As illustrated in FIGS. 1 and 2, a part of the first tip end 132*d* is exposed from the first through-hole 122*p* in the flat plate 120.

As illustrated in FIG. 6, the first flange section 132*e* is located at the boundary between the main body 132*c* and the first tip end 132*d*. The outer diameter of the first flange section 132*e* (the length in the X direction) is greater than the outer diameter of the main body 132*c* (the length in the X direction). The outer diameter of the first flange section 132*e* (the length in the X direction) is greater than the opening diameter of the first through-hole 122*p*.

The second flange section 132*f* is located at the center of the main body 132*c* extending in the Z direction. The outer diameter of the second flange section 132*f* (the length in the X direction) is greater than the outer diameter of the main body 132*c* (the length in the X direction).

The actuator 132 is placed in the first placement chamber 112. The first placement chamber 112 is located below the flat plate 120. The securing section 132*a* of the actuator 132 is attached to a bottom surface of the first placement chamber 112. A through-hole 112*p* is provided at an upper portion of the first placement chamber 112. The through-hole 112*p* of the first placement chamber 112 communicates with the first through-hole 122*p* in the flat plate 120. The opening diameter of the through-hole 112*p* of the first placement chamber 112 (the length in the X direction) is greater than the outer diameter of the first tip end 132*d* of the actuator 132 (the length in the X direction).

The actuator 142 has a shape in which an upper portion of a conical shape and a lower portion of a substantially columnar shape are integrated. The actuator 142 has a securing section 142*a* and an outer peripheral portion 142*b*. The securing section 142*a* has a columnar shape. The outer peripheral portion 142*b* has a cylindrical shape with a conical shape provided at the tip end, and the outer peripheral portion 142*b* is arranged at an outer periphery of the securing section 142*a*. The outer peripheral portion 142*b* moves relative to the securing section 142*a*.

The outer peripheral portion 142*b* has a main body 142*c*, a second tip end 142*d*, a first flange section 142*e*, and a second flange section 142*f*. The second tip end 142*d* has a conical shape. The second tip end 142*d* is provided at the main body 142c on the side of the +Z direction, and the second tip end 142d is located at the tip end of the actuator 142.

The first flange section 142e is located at a boundary between the main body 142c and the second tip end 142d. The outer diameter of the first flange section 142e (the length in the X direction) is greater than the outer diameter of the main body 142c (the length in the X direction). The second flange section 142f is located at the center of the main body 142c extending in the Z direction. The outer diameter of the first flange section 142e (the length in the X direction) is greater than the opening diameter of the second through-hole 124p of the flat plate 120 (the length in the X direction).

The actuator 142 is placed in a second placement chamber 114. The second placement chamber 114 is located below the flat plate 120. The securing section 142a of the actuator 142 is attached to a bottom surface of the second placement chamber 114. A through-hole 114p is provided at an upper portion of the second placement chamber 114. The through-hole 114p of the second placement chamber 114 communicates with the second through-hole 124p in the flat plate 120. The opening diameter of the through-hole 114p of the second placement chamber 114 (the length in the X direction) is greater than the outer diameter of the second tip end 142d of the actuator 142 (the length in the X direction).

Note that the first moving section 130 preferably further includes a spring 134 as illustrated in FIGS. 5 and 6. The spring 134 is arranged in the first placement chamber 112. One end of the spring 134 is attached to the upper surface of the first placement chamber 112, and the other end of the spring 134 is attached to the second flange section 132f.

Similarly, the second moving section 140 preferably further includes a spring 144. The spring 144 is arranged in the second placement chamber 114. One end of the spring 144 is attached to an upper surface of the second placement chamber 114, and the other end of the spring 144 is attached to the second flange section 142f.

Note that a spring 126 is placed between the flat plate 120 and a plate member extending from the side surface of the second placement chamber 114 in the +Y direction. One end of the spring 126 is attached to a rear surface of the flat plate 120, and the other end of the spring 126 is attached to the plate member extending from the side surface of the second placement chamber 114.

In a case in which the carrier vehicle 100 is in the reference mode, the first moving section 130 and the second moving section 140 causes the flat plate 120 to move to the reference position. In this case, the height of the flat plate 120 (the position in the Z direction) can be equal to the height of the upper surface 110a of the case body 110 (the position in the Z direction). Therefore, the carrier vehicle 100 can place a carried article on larger areas of the upper surface 110a and the flat plate 120 and carry the carried article.

Figure 7:
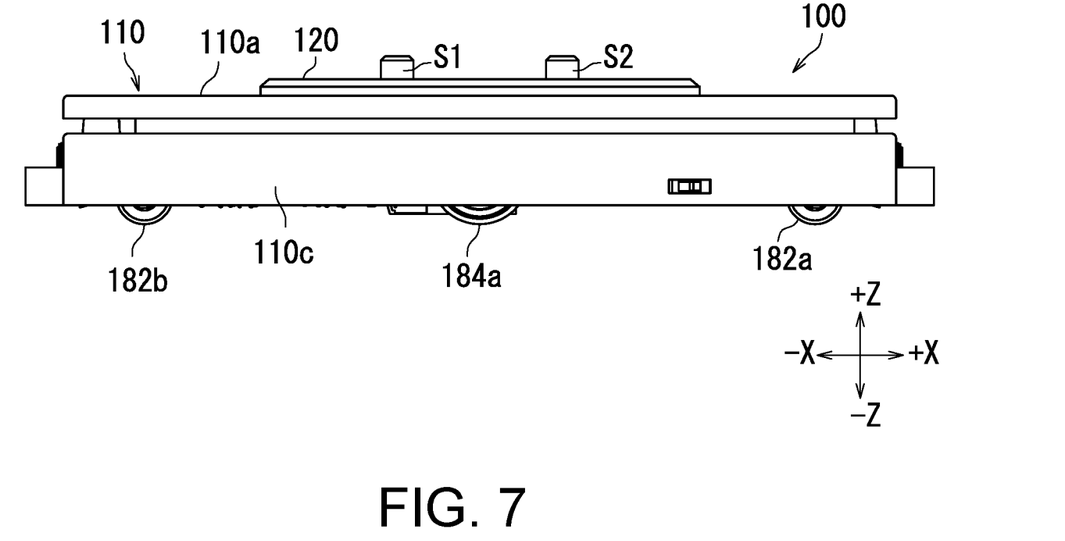
FIG. 7 is a schematic side view illustrating the carrier vehicle in a penetrating mode according to the embodiment.
Figure 8:
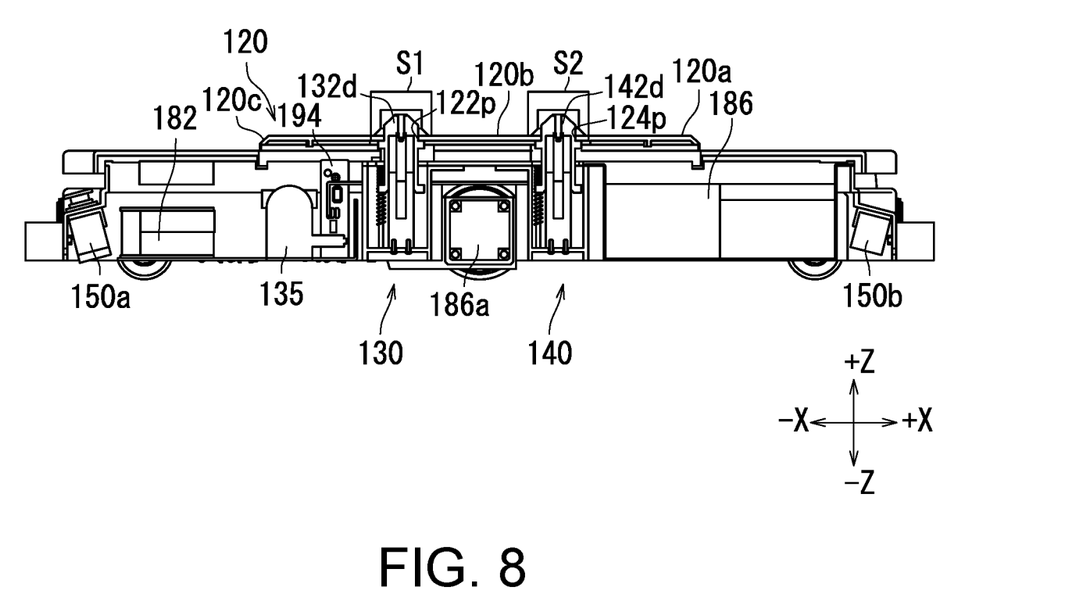
FIG. 8 is a schematic sectional view illustrating the carrier vehicle in the penetrating mode according to the embodiment.
Figure 9:
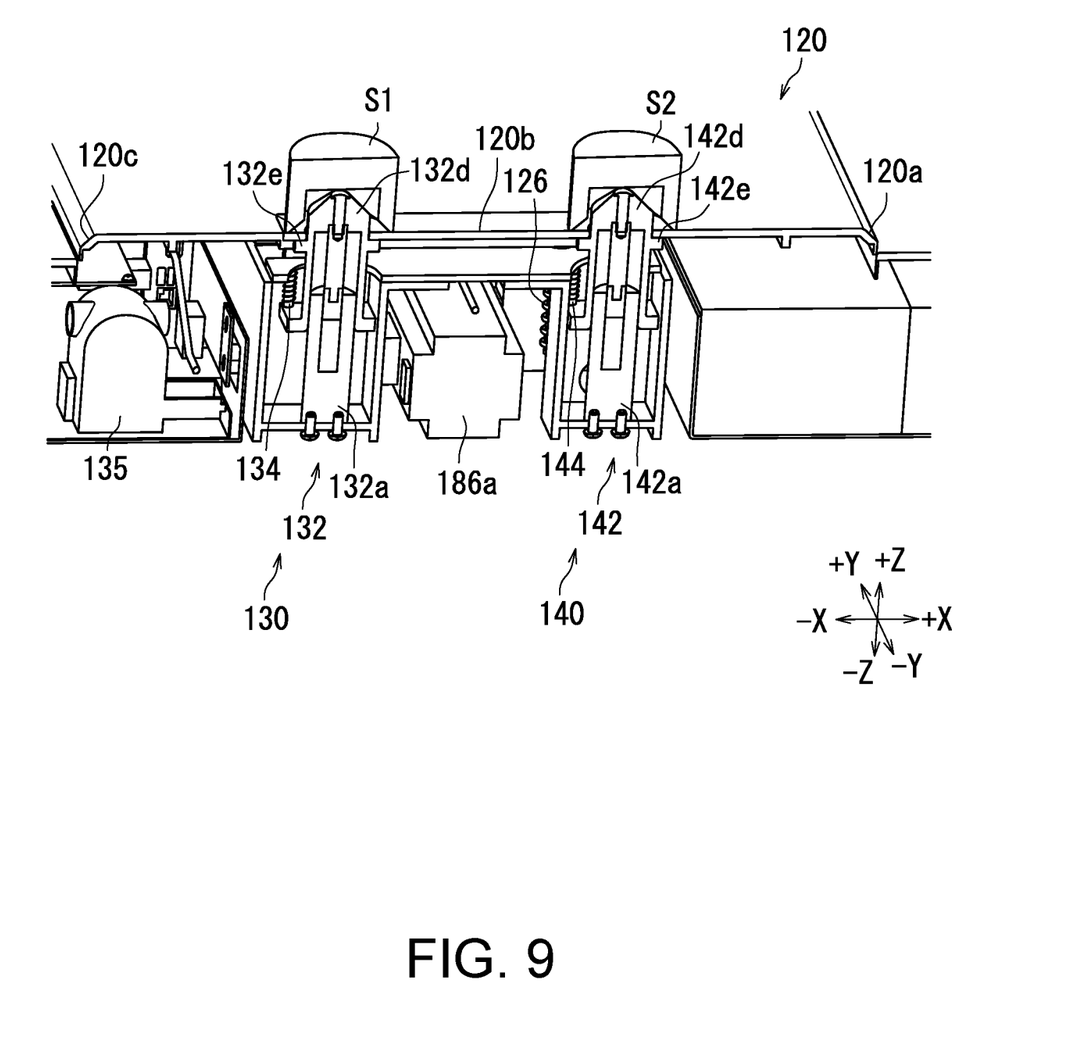
FIG. 9 is another schematic sectional view illustrating the carrier vehicle in the penetrating mode according to the embodiment.

Next, the carrier vehicle 100 in the penetrating mode according to the embodiment will be described with reference to FIGS. 7 to 9. FIG. 7 is a schematic side view illustrating the carrier vehicle 100 in the penetrating mode, FIG. 8 is a schematic sectional view illustrating the carrier vehicle 100 in the penetrating mode, and FIG. 9 is another schematic sectional view of the carrier vehicle 100 in the penetrating mode. In the penetrating mode, the first tip end 132d of the first moving section 130 and the second tip end 142d of the second moving section 140 penetrate through the flat plate 120 in the carrier vehicle 100. In the penetrating mode, the first tip end 132d of the first moving section 130 and the second tip end 142d of the second moving section 140 that penetrate through the flat plate 120 are suitably used to tow the carried article.

As illustrated in FIG. 7, the first tip end 132d of the first moving section 130 and the second tip end 142d of the second moving section 140 penetrate through the flat plate 120 in the penetrating mode. However, the first tip end 132d of the first moving section 130 is covered with a cup S1 with a hollow shape, and the second tip end 142d of the second moving section 140 is covered with a cup S2 with a hollow shape in FIG. 7. The cup S1 and the cup S2 are attached to the carried article. Note that although the height of the flat plate 120 (the position in the Z direction) is substantially the same as the height of the upper surface 110a of the case body 110 (the position in the Z direction) in the reference mode, the height of the flat plate 120 (the position in the Z direction) is higher than the height of the upper surface 110a of the case body 110 (the position in the Z direction) in the penetrating mode.

As illustrated in FIGS. 8 and 9, the first moving section 130 and the second moving section 140 move relative to the flat plate 120 in the penetrating mode, and as a result, the first tip end 132d of the first moving section 130 penetrates through the first through-hole 122p of the flat plate 120. Note that since the outer diameter of the first flange section 132e (the length in the X direction) is greater than the opening diameter of the first through-hole 122p, the first flange section 132e does not penetrate through the first through-hole 122p. Therefore, the first tip end 132d located on the upper side than the first flange section 132e in the vertical direction penetrates through the first through-hole 122p of the flat plate 120. Therefore, it is possible to allow only a part of the first moving section 130 to penetrate through the first through-hole 122p in the flat plate 120 with a simple configuration.

Also, the second tip end 142d of the second moving section 140 similarly penetrates through the second through-hole 124p in the flat plate 120. Note that since the outer diameter of the first flange section 142e (length in the X direction) is greater than the opening diameter of the second through-hole 124p, the first flange section 142e does not penetrate through the second through-hole 124p. Therefore, the second tip end 142d located on the upper side than the first flange section 142e in the vertical direction penetrates through the second through-hole 124p in the flat plate 120. Therefore, it is possible to allow only a part of the second moving section 140 to penetrate through the second through-hole 124p in the flat plate 120 with a simple configuration.

Specifically, if the reference mode changes to the penetrating mode, the outer peripheral portion 132b of the actuator 132 moves relative to the securing section 132a by the pump 135 increasing the hydraulic pressure. Here, the outer peripheral portion 132b is lifted relative to the securing section 132a. Therefore, the first tip end 132d of the first moving section 130 penetrates through the through-hole 112p of the first placement chamber 112 and the first through-hole 122p in the flat plate 120 and appears above the flat plate 120.

Similarly, if the reference mode changes to the penetrating mode, the outer peripheral portion 142b of the actuator 142 moves relative to the securing section 142a by the pump 135 increasing the hydraulic pressure. Here, the outer peripheral portion 142b is lifted relative to the securing section 142a. Therefore, the second tip end 142d of the second moving section 140 penetrates through the through-hole 114p of the second placement chamber 114 and the second through-hole 124p in the flat plate 120 and appears above the flat plate 120.

In a case in which the carrier vehicle 100 is in the penetrating mode, the first tip end 132d of the first moving section 130 penetrates through the first through-hole 122p in the flat plate 120, and the second tip end 142d of the second moving section 140 penetrates through the second through-hole 124p in the flat plate 120. In this case, the carrier vehicle 100 can carry the carried article using the first tip end 132d of the first moving section 130 penetrating through the first through-hole 122p of the flat plate 120 and the second tip end 142d of the second moving section 140 penetrating through the second through-hole 124p. In a case in which the carried article itself has wheels, for example, it is possible to tow the carried article by the carrier vehicle 100 by hooking a part of the carried article at the first tip end 132d of the first moving section 130 and/or the second tip end 142d of the second moving section 140.

Note that in a case in which the first tip end 132d of the actuator 132 penetrates through the first through-hole 122p of the flat plate 120, it is possible to appropriately adjust whether or not the flat plate 120 is to be moved. In a case in which the distance between the flat plate 120 and the first flange section 132e at the reference position is longer than the moving distance of the actuator 132, for example, even if the first tip end 132d of the actuator 132 penetrates through the first through-hole 122p in the flat plate 120, the first flange section 132e of the actuator 132 is not brought into contact with the flat plate 120, and the flat plate 120 does not move. Therefore, in a case in which the distance between the flat plate 120 and the first flange section 132e at the reference position is longer than the maximum moving distance of the actuator 132, even if the first tip end 132d of the actuator 132 penetrates through the first through-hole 122p in the flat plate 120, the first flange section 132e of the actuator 132 is not brought into contact with the flat plate 120, and the flat plate 120 does not move.

Similarly, in a case in which the second tip end 142d of the actuator 142 penetrates through the second through-hole 124p in the flat plate 120, it is possible to appropriately adjust whether or not the flat plate 120 is to be moved. In a case in which the distance between the flat plate 120 and the first flange section 142e at the reference position is longer than the moving distance of the actuator 142, for example, even if the second tip end 142d of the actuator 142 penetrates through the first through-hole 122p in the flat plate 120, the first flange section 142e of the actuator 142 is not brought into contact with the flat plate 120, and the flat plate 120 does not move. Therefore, in a case in which the distance between the flat plate 120 and the first flange section 142e at the reference position is longer than the maximum moving distance of the actuator 142, even if the second tip end 142d of the actuator 142 penetrates through the first through-hole 122p in the flat plate 120, the first flange section 142e of the actuator 142 is not brought into contact with the flat plate 120, and the flat plate 120 does not move. In this manner, it is possible to adjust the moving of the flat plate 120 in the penetrating mode in accordance with the distance between the flat plate 120 and the first flange section 132e and the first flange section 142e at the reference position.

Note that the flat plate 120 further has an end 120c in addition to the peripheral portion 120a and the central portion 120b as illustrated in FIGS. 8 and 9. The peripheral portion 120a and the central portion 120b expand in the X direction and the Y direction. The end 120c of the flat plate 120 extends in the −Z direction relative to the peripheral portion 120a. Note that in a case in which the flat plate 120 moves in the penetrating mode, the length of the end 120c in the Z direction is preferably equal to or greater than the moving distance of the flat plate 120. In this case, even after the reference mode changes to the penetrating mode and the position of the flat plate 120 moves, substantially no gap occurs between the flat plate 120 and the upper surface 110a of the case body 110 after moving, and it is possible to curb entrance of foreign matters and the like to the inside of the carrier vehicle 100.

Note that as will be understood from comparison between FIGS. 5 and 6 in the reference mode and FIGS. 8 and 9 in the penetrating mode, the hydraulic pressure from the pump 135 to the actuator 132 is switched to off, and the outer peripheral portion 132b of the actuator 132 is lowered to the securing section 132a in a case in which the penetrating mode returns to the reference mode. In this case, it is possible to easily lower the outer peripheral portion 132b of the actuator 132 with the spring 134 and to return the first moving section 130 to the reference position in a short period.

Similarly, in a case in which the penetrating mode returns to the reference mode, the hydraulic pressure from the pump 135 to the actuator 142 is switched to off, and the outer peripheral portion 142b of the actuator 142 is lowered to the securing section 142a. In this case, it is possible to easily lower the outer peripheral portion 142b of the actuator 142 with the spring 144 and to return the second moving section 140 to the reference position in a short term.

Further, in a case in which the penetrating mode is returned to the reference mode, the hydraulic pressure from the pump 135 to the actuator 142 is switched to off, and the outer peripheral portion 142b of the actuator 142 is lowered to the securing section 142a. In this case, it is possible to easily lower the flat plate 120 with the spring 126 and to return the flat plate 120 to the reference position in a short term.

Note that although the first tip end 132d of the first moving section 130 penetrates through the first through-hole 122p in the flat plate 120 and the second tip end 142d of the second moving section 140 penetrates through the second through-hole 124p in the flat plate 120 if the first moving section 130 and the second moving section 140 of the carrier vehicle 100 move in the above description, the disclosure is not limited thereto. The first moving section 130 may have a member that curbs penetration of the first tip end 132d of the first moving section 130 through the first through-hole 122p in the flat plate 120. The second moving section 140 may have a member that curbs penetration of the second tip end 142d of the second moving section 140 through the second through-hole 124p in the flat plate 120.

Figure 10:
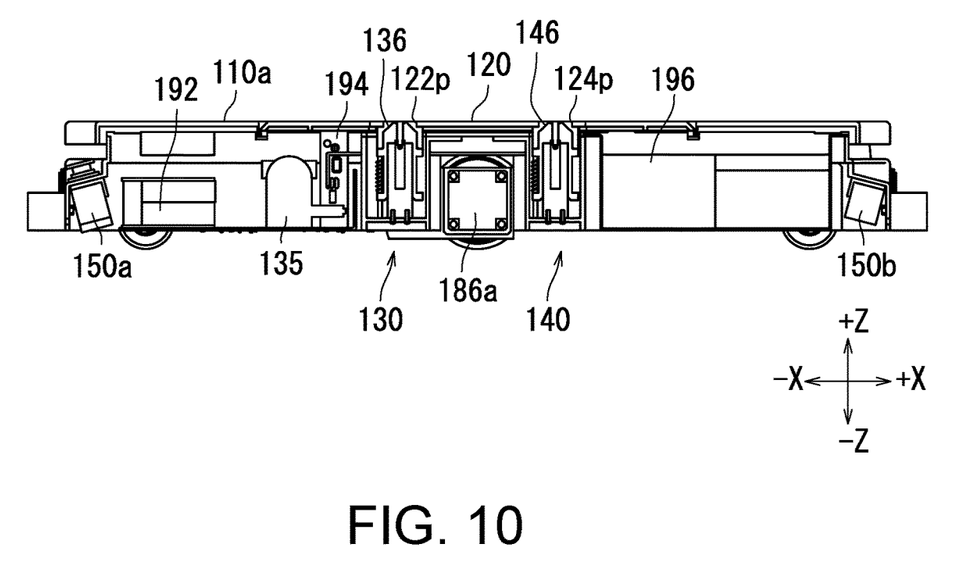
FIG. 10 is a schematic sectional view illustrating the carrier vehicle in the reference mode according to the embodiment.
Figure 11:
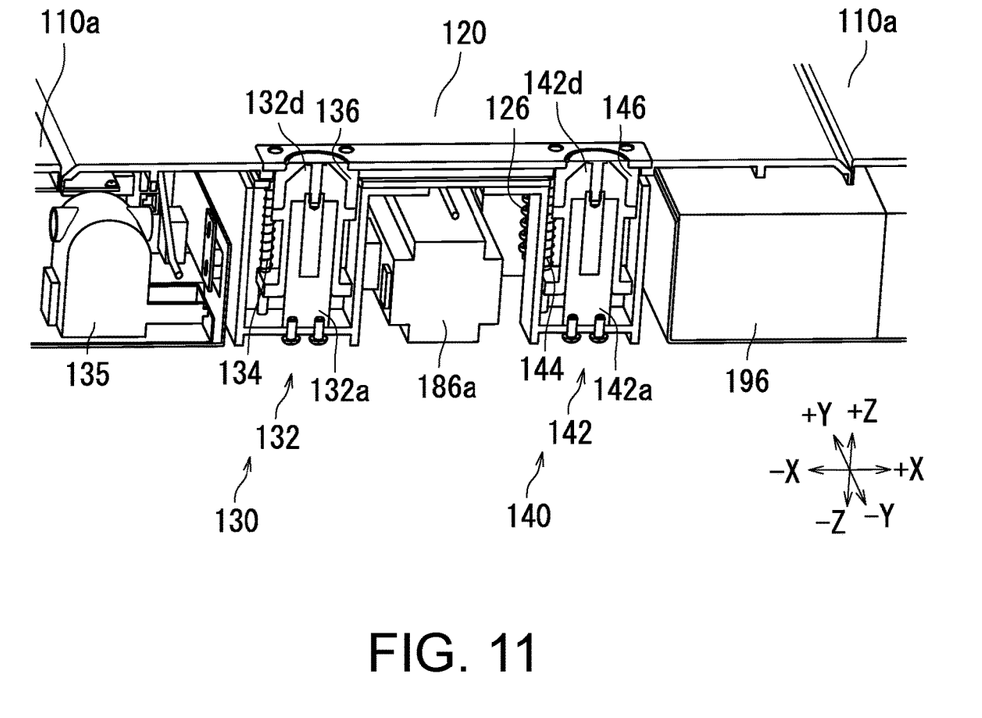
FIG. 11 is another schematic sectional view illustrating the carrier vehicle in the reference mode according to the embodiment.

Hereinafter, the carrier vehicle 100 according to the embodiment will be described with reference to FIGS. 10 and 11. FIG. 10 is a schematic sectional view illustrating the carrier vehicle 100 in the reference mode, and FIG. 11 is another schematic sectional view illustrating the carrier vehicle 100 in the reference mode. The carrier vehicle 100 illustrated in FIGS. 10 and 11 has a configuration similar to that of the carrier vehicle 100 described above with reference to FIGS. 5 and 6 other than that the first moving section 130 further has a penetration curbing member 136 and the second moving section 140 further has a penetration curbing member 146. In the following description, repeated description may be omitted in order to avoid redundancy.

The first moving section 130 further has the penetration curbing member 136 in addition to the actuator 132 and the spring 134. The penetration curbing member 136 is attached to the first tip end 132d of the actuator 132. For example, the penetration curbing member 136 can be attached to the first tip end 132d of the actuator 132 in a state in which the central portion 120b of the flat plate 120 is removed from the peripheral portion 120a.

Note that the outer diameter of the first tip end 132d of the first moving section 130 is smaller than the opening diameter of the first through-hole 122p in the flat plate 120 as described above. Meanwhile, the outer diameter of at least a part of the penetration curbing member 136 is greater than the opening diameter of the first through-hole 122p in the flat plate 120.

Here, the outer diameter of the upper portion (on the side of the +Z direction) of the penetration curbing member 136 is smaller than the opening diameter of the first through-hole 122p in the flat plate 120, and the outer diameter of the lower portion (on the side of the −Z direction) of the penetration curbing member 136 is greater than the opening diameter of the first through-hole 122p in the flat plate 120. In this manner, one step difference is provided at the outer periphery of the penetration curbing member 136.

As described above, the penetration curbing member 136 is attached to the first tip end 132d capable of penetrating through the first through-hole 122p in the flat plate 120 in the first moving section 130. The penetration curbing member 136 curbs penetration of the first tip end 132d through the first through-hole 122p in the flat plate 120. Therefore, it is possible to easily switch whether or not the first tip end 132d penetrates through the first through-hole 122p in the flat plate 120 by attaching and detaching the penetration curbing member 136 to the first tip end 132d of the first moving section 130.

The second moving section 140 further has the penetration curbing member 146 in addition to the actuator 142 and the spring 144. The penetration curbing member 146 is attached to the second tip end 142d of the actuator 142. For example, the penetration curbing member 146 can be attached to the second tip end 142d of the actuator 142 in a state in which the central portion 120b of the flat plate 120 is removed from the peripheral portion 120a.

As described above, the outer diameter of the second tip end 142d of the second moving section 140 is smaller than the opening diameter of the second through-hole 124p in the flat plate 120. Meanwhile, the outer diameter of at least a part of the penetration curbing member 146 is greater than the opening diameter of the second through-hole 124p in the flat plate 120.

Here, the outer diameter of the upper portion (on the side of the +Z direction) of the penetration curbing member 146 is smaller than the opening diameter of the first through-hole 122p in the flat plate 120, and the outer diameter of the lower portion (on the side of the −Z direction) of the penetration curbing member 146 is greater than the opening diameter of the first through-hole 122p in the flat plate 120. In this manner, one step difference is provided at the outer periphery of the penetration curbing member 146.

As described above, the penetration curbing member 146 is attached to the second tip end 142d capable of penetrating through the second through-hole 124p in the flat plate 120 in the second moving section 140. The penetration curbing member 146 curbs penetration of the second tip end 142d through the second through-hole 124p in the flat plate 120. Therefore, it is possible to easily switch whether or not the second tip end 142d penetrates through the second through-hole 124p in the flat plate 120 by attaching and detaching the penetration curbing member 146 to and from the second tip end 142d of the second moving section 140.

Note that although the first moving section 130 moves and the first tip end 132d of the first moving section 130 penetrates through the first through-hole 122p in the flat plate 120, and the second moving section 140 moves and the second tip end 142d of the second moving section 140 penetrates through the second through-hole 124p in the flat plate 120 in the description given with reference to FIGS. 7 to 9, the disclosure is not limited thereto. The first moving section 130 may move the flat plate 120 from the reference position to the moving position without penetrating through the first through-hole 122p in the flat plate 120, and the second moving section 140 may move the flat plate 120 from the reference position to the moving position without penetrating through the second through-hole 124p in the flat plate 120.

Figure 12:
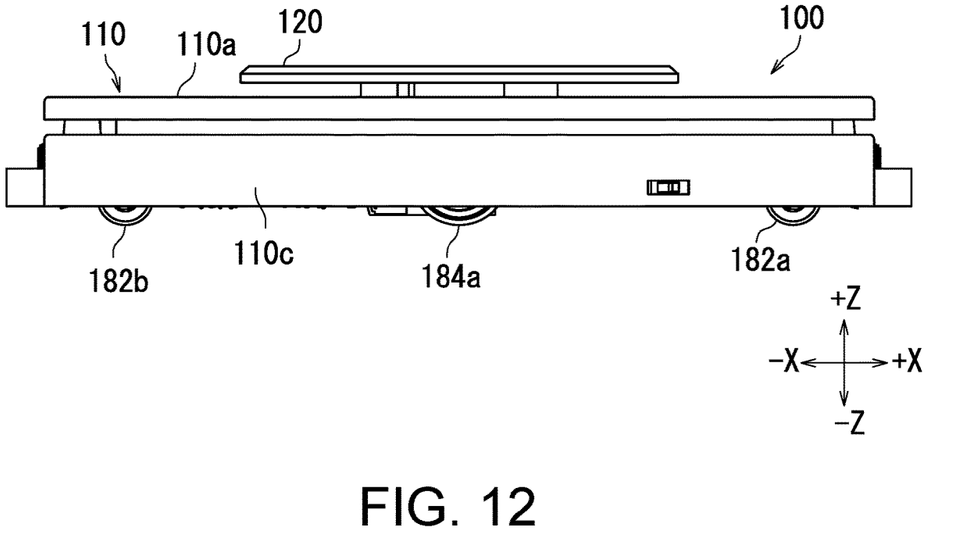
FIG. 12 is a schematic side view illustrating the carrier vehicle in a moving mode according to the embodiment.
Figure 13:
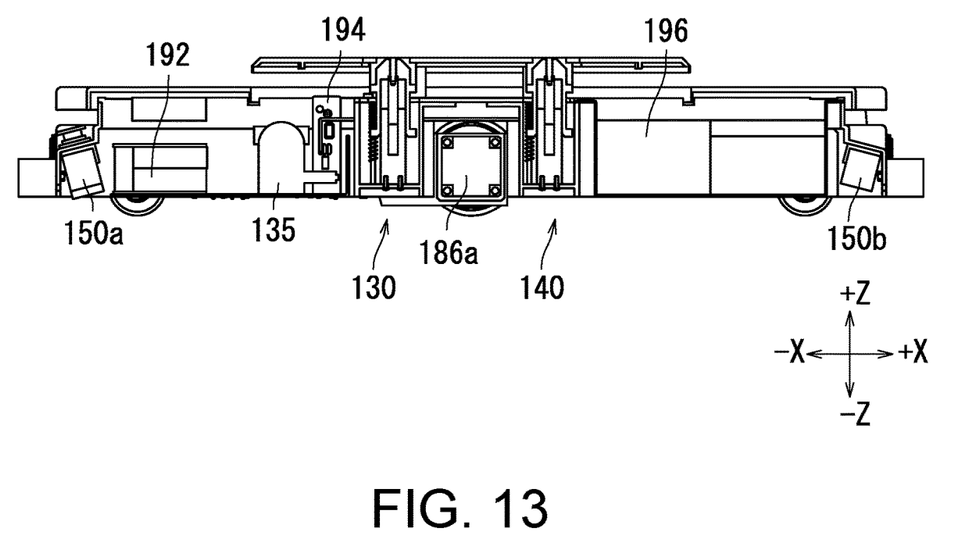
FIG. 13 is a schematic sectional view illustrating the carrier vehicle in the moving mode according to the embodiment.

Next, the carrier vehicle 100 in the moving mode according to the embodiment will be described with reference to FIGS. 12 to 14. FIG. 12 is a schematic side view illustrating the carrier vehicle 100 in the moving mode. FIG. 13 is a schematic sectional view illustrating the carrier vehicle 100 in the moving mode, and FIG. 14 is another schematic sectional view illustrating the carrier vehicle 100 in the moving mode.

In a case in which the reference mode changes to the moving mode, the flat plate 120 moves from the upper surface 110a of the case body 110 to the upper side as illustrated in FIG. 12.

Figure 14:
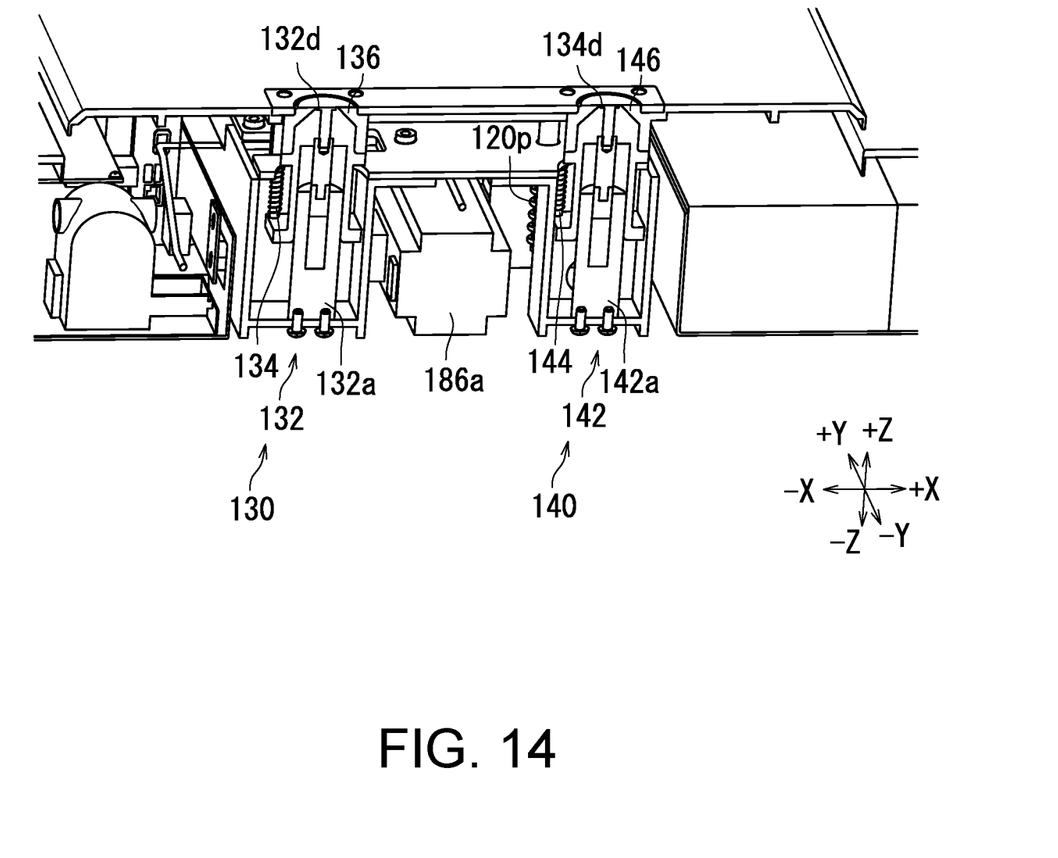
FIG. 14 is another schematic sectional view illustrating the carrier vehicle in the moving mode according to the embodiment.

As illustrated in FIGS. 13 and 14, the first moving section 130 is located at the moving position, and the second moving section 140 is located at the moving position in the moving mode. Here, the moving position of the first moving section 130 is located on the upper side in the vertical direction (+Z direction) relative to the reference position, and the moving position of the second moving section 140 is located on the upper side in the vertical direction (+Z direction) relative to the reference position.

In the moving mode, the first moving section 130 causes the flat plate 120 to move along with the penetration curbing member 136. In this manner, even if the outer diameter of the first tip end 132d of the first moving section 130 is smaller than the opening diameter of the first through-hole 122p of the flat plate 120, it is possible to move the flat plate 120 without allowing the first tip end 132d of the first moving section 130 to penetrate through the first through-hole 122p in the flat plate 120.

Similarly, in the moving mode, the second moving section 140 causes the flat plate 120 to move along with the penetration curbing member 146. In this manner, even if the outer diameter of the second tip end 142d of the second moving section 140 is smaller than the opening diameter of the second through-hole 124p in the flat plate 120, it is possible to move the flat plate 120 without allowing the second tip end 142d of the second moving section 140 to penetrate through the second through-hole 124p in the flat plate 120.

As will be understood from comparison between FIGS. 10 and 11 and FIGS. 13 and 14, the first moving section 130 moves from the reference position to the moving position, and the second moving section 140 moves from the reference position to the moving position in a case in which the reference mode changes to the moving mode.

Here, if the reference mode changes to the moving mode, the outer peripheral portion 132b of the actuator 132 moves relative to the securing section 132a by the pump 135 increasing the hydraulic pressure. The outer peripheral portion 132b is lifted relative to the securing section 132a. Since the penetration curbing member 136 attached to the first tip end 132d of the actuator 132 is greater than the first through-hole 122p, the actuator 132 causes the flat plate 120 itself to move via the penetration curbing member 136.

Similarly, the outer peripheral portion 142b of the actuator 142 moves relative to the securing section 142a. Here, the outer peripheral portion 142b is lifted relative to the securing section 142a. Since the penetration curbing member 146 attached to the second tip end 142d of the actuator 142 is greater than the second through-hole 124p, the actuator 142 causes the flat plate 120 itself to move via the penetration curbing member 146.

If the carrier vehicle 100 changes from the reference mode to the moving mode, the first moving section 130 and the second moving section 140 causes the flat plate 120 move from the reference position to the moving position without penetrating through the first through-hole 122p and the second through-hole 124p in the flat plate 120. In this case, the carrier vehicle 100 can pressurizes the carried article from the lower side of the carried article. In a case in which the carried article is locked by a holding member, for example, the carrier vehicle 100 can release locking of the carried article and carry the carried article by the carrier vehicle 100 pressurizing the carried article from the lower side of the carried article and releasing the locking.

Note that even in a case in which the actuator 132 and the actuator 142 move only by the maximum moving distance, the height of the flat plate 120 relative to the upper surface 110a of the case body 110 can be reduced as compared with the maximum moving distance. In a case in which the height of the penetration curbing member 136 and the penetration curbing member 146 (the position in the Z direction) is lower than the height of the flat plate 120 (the position in the Z direction) in a case in which the first moving section 130 and the second moving section 140 are caused to move to the lowest position, it is possible to reduce the height of the flat plate 120 relative to the upper surface 110a of the case body 110 as compared with the maximum moving distance even in a case in which the actuator 132 and the actuator 142 move by the maximum moving distance.

Note that the peripheral portion 120a and the central portion 120b expand in the X direction and the Y direction as illustrated in FIGS. 13 and 14. The end 120c of the flat plate 120 extends in the −Z direction relative to the peripheral portion 120a. Note that in a case in which the flat plate 120 moves in the moving mode, the length of the end 120c in the Z direction is preferably equal to or greater than the moving distance of the flat plate 120. In this case, even after the reference mode changes to the moving mode and the position of the flat plate 120 moves, substantially no gap is generated between the flat plate 120 and the upper surface 110a of the case body 110 after moving, it is possible to curb entrance of foreign matters and the like to the inside of the carrier vehicle 100.

As described above, the outer diameter of the first tip end 132d of the first moving section 130 (the length in the X direction) is smaller than the opening diameter of the first through-hole 122p (the length in the X direction) in the flat plate 120, and the first tip end 132d of the first moving section 130 can penetrate through the first through-hole 122p in the flat plate 120. Meanwhile, the diameter of the penetration curbing member 136 is greater than the diameter of the first through-hole 122p in the flat plate 120, and the penetration curbing member 136 cannot penetrate through the first through-hole 122p in the flat plate 120. Therefore, it is possible to curb penetration of the first tip end 132d of the first moving section 130 through the first through-hole 122p in the flat plate 120 by attaching the penetration curbing member 136 to the first tip end 132d of the first moving section 130.

Note that although the carrier vehicle 100 includes the first moving section 130 and the second moving section 140 in the description given above with reference to FIGS. 1 to 14, the disclosure is not limited thereto. The number of moving sections included in the carrier vehicle 100 may be one. Alternatively, the carrier vehicle 100 may include three or more moving sections. However, in a case in which towing is performed in the penetrating mode, the carrier vehicle 100 preferably includes two or more moving sections. It is possible to tow the carried article without changing the posture of the carried article by towing the carried article with the two or more moving sections. Also, it is possible to disperse a load of the carried article in the towing in the penetrating mode and in the moving mode by the carrier vehicle 100 including the plurality of moving sections.

In addition, although each of the penetration curbing member 136 and the penetration curbing member 146 has one step difference and the opening diameters of the first through-hole 122p and the second through-hole 124p in the flat plate 120 are constant in the description given above with reference to FIGS. 10 to 14, the disclosure is not limited thereto. The penetration curbing member 136 and the penetration curbing member 146 have a plurality of step differences, and holes with different opening diameters may communicate with each other as the first through-hole 122p and the second through-hole 124p in the flat plate 120.

Note that although the unmanned carrier vehicle has been described as an example of the carrier vehicle 100 in the description given above with reference to FIGS. 1 to 14, the disclosure is not limited thereto. The carrier vehicle 100 may not be adapted to carry a carried article in an unmanned fashion. For example, the carrier vehicle 100 may be adapted to carry the carried article through operations of a person.

The embodiments of the disclosure have been described above with reference to the drawings (FIGS. 1 to 14). However, the disclosure is not limited to the aforementioned embodiments and can be implemented in various modes without departing from the gist thereof. Also, the plurality of components disclosed in the aforementioned embodiments can be appropriately modified. For example, a certain component among all components in a certain embodiment may be added to a component in another embodiment, or some components among all components described in a certain embodiment may be deleted from the embodiment.

In addition, the drawings mainly schematically illustrate the respective components for easy understanding of the disclosure, and thicknesses, lengths, numbers, intervals, and the like of the respective components illustrated in the drawings may be different from actual ones for convenience of creating the drawings. Also, the configurations of the respective components described in the aforementioned embodiments are just examples and are not particularly limited, and it is needless to say that various modifications can be made without substantially departing from the advantages of the disclosure.

The disclosure is suitably used for a carrier vehicle, for example.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A carrier vehicle comprising:
a flat plate through which a through-hole is provided; and
a moving section that causes the flat plate to move,
wherein the moving section is switched among
a reference mode in which the flat plate is caused to move to a reference position,
a penetrating mode in which the through-hole in the flat plate is penetrated through, and
a moving mode in which the flat plate is caused to move from the reference position to a moving position without penetrating through the through-hole in the flat plate.

2. The carrier vehicle according to claim 1, wherein the moving section comprises
a tip end that is able to penetrate through the through-hole in the flat plate, and
a penetration curbing member that is attached to the tip end and curbs penetration of the tip end of the moving section through the through-hole.

3. The carrier vehicle according to claim 2, wherein in the moving mode, the moving section causes the flat plate to move along with the penetration curbing member.

4. The carrier vehicle according to claim 3, wherein the moving section has a flange section with a diameter that is greater than a diameter of the through-hole in the flat plate.

5. The carrier vehicle according to claim 4, wherein the number of the moving sections is two.

6. The carrier vehicle according to claim 5, further comprising:
a case body in which the flat plate is placed;
a first operation section that is provided at one end of the case body; and
a second operation section that is provided at the other end of the case body.

7. The carrier vehicle according to claim 3, wherein the number of the moving sections is two.

8. The carrier vehicle according to claim 3, further comprising:
a case body in which the flat plate is placed;
a first operation section that is provided at one end of the case body; and
a second operation section that is provided at the other end of the case body.

9. The carrier vehicle according to claim 2, wherein the moving section has a flange section with a diameter that is greater than a diameter of the through-hole in the flat plate.

10. The carrier vehicle according to claim 9, wherein the number of the moving sections is two.

11. The carrier vehicle according to claim 10, further comprising:
a case body in which the flat plate is placed;
a first operation section that is provided at one end of the case body; and
a second operation section that is provided at the other end of the case body.

12. The carrier vehicle according to claim 9, further comprising:
a case body in which the flat plate is placed;
a first operation section that is provided at one end of the case body; and
a second operation section that is provided at the other end of the case body.

13. The carrier vehicle according to claim 2, wherein the number of the moving sections is two.

14. The carrier vehicle according to claim 13, further comprising:
a case body in which the flat plate is placed;
a first operation section that is provided at one end of the case body; and
a second operation section that is provided at the other end of the case body.

15. The carrier vehicle according to claim 2, further comprising:
a case body in which the flat plate is placed;
a first operation section that is provided at one end of the case body; and
a second operation section that is provided at the other end of the case body.

16. The carrier vehicle according to claim 1, wherein the moving section has a flange section with a diameter that is greater than a diameter of the through-hole in the flat plate.

17. The carrier vehicle according to claim 16, wherein the number of the moving sections is two.

18. The carrier vehicle according to claim 16, further comprising:
a case body in which the flat plate is placed;
a first operation section that is provided at one end of the case body; and
a second operation section that is provided at the other end of the case body.

19. The carrier vehicle according to claim 1, wherein the number of the moving sections is two.

20. The carrier vehicle according to claim 1, further comprising:
a case body in which the flat plate is placed;
a first operation section that is provided at one end of the case body; and
a second operation section that is provided at the other end of the case body.

* * * * *